United States Patent [19]
Vo

[11] Patent Number: 5,712,986
[45] Date of Patent: Jan. 27, 1998

[54] ASYNCHRONOUS PCI-TO-PCI BRIDGE

[75] Inventor: Tri Tinh Vo, San Diego, Calif.

[73] Assignee: NCR Corporation, Dayton, Ohio

[21] Appl. No.: 580,000

[22] Filed: Dec. 19, 1995

[51] Int. Cl.$^6$ .............................................. G06F 13/00
[52] U.S. Cl. ........................... 395/309; 395/306; 395/308; 395/287; 395/559
[58] Field of Search ............................ 395/500, 325, 395/550, 750, 306, 309, 250, 880, 559, 552, 287, 308; 375/356; 370/60; 364/200 MS File, 270.5, 271

[56] References Cited

U.S. PATENT DOCUMENTS

| | | | |
|---|---|---|---|
| 5,191,657 | 3/1993 | Ludwig et al. | 395/325 |
| 5,434,996 | 7/1995 | Bell | 395/550 |
| 5,450,458 | 9/1995 | Price et al. | 375/356 |
| 5,455,915 | 10/1995 | Coke | 395/325 |
| 5,493,684 | 2/1996 | Gephardt et al. | 395/750 |
| 5,522,050 | 5/1996 | Amini et al. | 395/306 |
| 5,535,340 | 7/1996 | Bell et al. | 395/292 |
| 5,535,341 | 7/1996 | Shah et al. | 395/306 |
| 5,542,053 | 7/1996 | Bland et al. | 395/309 |
| 5,542,056 | 7/1996 | Jaffa et al. | 395/306 |
| 5,544,162 | 8/1996 | Mraz et al. | 370/60 |
| 5,548,730 | 8/1996 | Young et al. | 395/280 |
| 5,550,989 | 8/1996 | Santos | 395/306 |
| 5,555,383 | 9/1996 | Elazar et al. | 395/306 |
| 5,557,758 | 9/1996 | Bland et al. | 395/308 |
| 5,586,268 | 12/1996 | Chen et al. | 395/250 |
| 5,606,672 | 2/1997 | Wade | 395/308 |
| 5,613,075 | 3/1997 | Wade et al. | 395/287 |
| 5,625,847 | 4/1997 | Ando et al. | 395/800 |
| 5,630,094 | 5/1997 | Hayek et al. | 395/473 |
| 5,630,145 | 5/1997 | Chen | 395/750 |
| 5,632,021 | 5/1997 | Jennings et al. | 395/309 |
| 5,634,013 | 5/1997 | Childers et al. | 395/280 |
| 5,642,489 | 6/1997 | Bland et al. | 395/308 |

FOREIGN PATENT DOCUMENTS

| | | |
|---|---|---|
| 0 384 621 A2 | 8/1990 | European Pat. Off. . |
| 0 645 715 A1 | 3/1995 | European Pat. Off. . |

OTHER PUBLICATIONS

"Establishing PCI Compliance Using Formal Verification: A Case Study", by Beer et al., IEEE, Computers and Communications, 1995 Int'l. Phoenix Conference, Jul. 1995, pp. 373–377.

Primary Examiner—Kevin J. Teska
Assistant Examiner—Russell W. Frejd
Attorney, Agent, or Firm—Merchant, Gould, Smith, Edell, Welter and Schmidt

[57] ABSTRACT

A method and apparatus of bridging a first device with a second device operating at a different clock frequency is described. The apparatus comprises a first bus slave interface coupled to the first device, and a second bus master interface coupled to the first bus slave interface and the second device, a second bus slave interface coupled to the second device, and a first bus master interface coupled to the second bus slave interface and the first device.

25 Claims, 9 Drawing Sheets

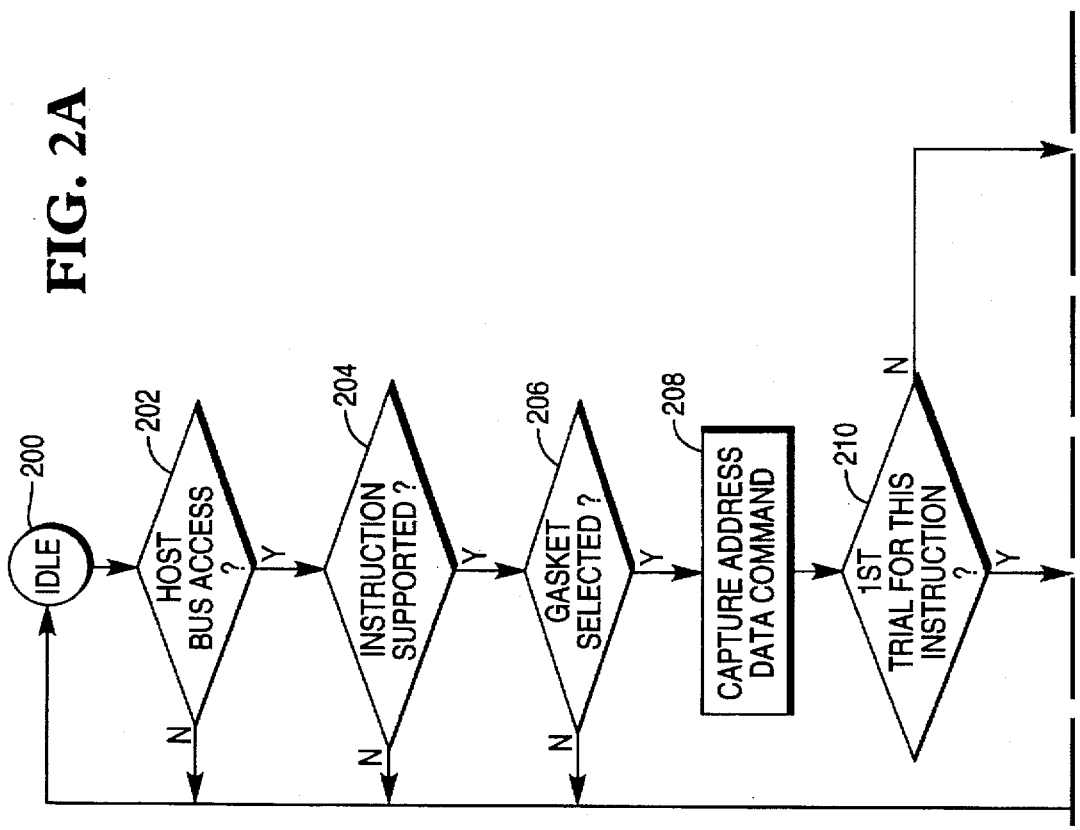

ASYNCHRONOUS PCI-TO-PCI BRIDGE

BACKGROUND OF THE INVENTION

1. Field of Invention

The present invention relates generally to bus interface devices, and in particular, to a method and apparatus for bridging two devices operating at different clock frequencies.

2. Description of Related Art

The PCI local bus is a high performance 32- or 64-bit bus with multiplexed address and data lines. The PCI local bus was defined to establish an industry standard for a high performance local bus architecture offering low cost. The PCI component and add-in card interface is processor-independent, enabling an efficient transition to future processor generations, and may be used with multiple processor architectures. This processor independence allows the PCI local bus to be optimized for I/O functions, enabling concurrent operations of the local bus with the processor/memory subsystem, and accommodating multiple high performance peripherals in addition to graphics such as motion video, SCSI, and hard disk drives.

The movement to enhance the video and multi-media displays of high definition TV and other three-dimensional or high bandwidth I/O will continue to increase local bus bandwidth requirements. The PCI interface is particularly useful in interconnecting highly integrated peripheral controller components, peripheral add-in boards, and processor/memory systems. The PCI interface standard also offers additional benefits to users of PCI-based systems. Configuration registers are specified for PCI components and add-in cards. A system with embedded auto-configuration software, it offers true ease of use for the system user by automatically configuring PCI add-in cards at power-on. The PCI Local Bus Specification, Rev. 2.0, which is incorporated by reference herein, defines the PCI interface protocol, electrical, mechanical, and configuration specifications for PCI local bus components and expansion boards.

Situations arise whereby interoperability between bus components or devices with independent or independently controllable clocks is desired. A user may desire interoperability between a host computer and a peripheral operating at a slower or faster clock speed. Further, the clock speed of either the host computer, the peripheral, or both may be controllable or variable. For example, the development of bus components and expansion boards is expedited using hardware emulators. These emulators allow the developer to use easily-modified software to test the logic implemented on the expansion boards and verify the real-time functionality of the proposed design. However, the functional adaptability of the hardware emulators is not achieved without cost. Typically, these hardware emulators must run at much slower clock speeds than the host device, and are thus incapable of interfacing with the host bus at full speed. This problem is especially critical when the host bus serves a PCI-compliant device, because of the high I/O speed capability of the PCI bus.

Accordingly, there is a need for a device and method allowing interoperability between bus components or devices with independent or independently controllable clocks. The present invention satisfies this need by providing an asynchronous bridge. This asynchronous bridge is useful not only in the development of bus components and expansion boards, but also to provide an interface between any devices operating at independent or independently controllable clock speeds.

SUMMARY OF THE INVENTION

To overcome the limitations in the prior art described above, and to overcome other limitations that will become apparent upon reading and understanding the present specification, the present invention discloses a method and apparatus for bridging a first device operating at a first clock frequency with a second device operating at a second clock frequency.

The method comprises the steps of receiving a first command message from the first device in a bridge coupled between the first and the second device, storing the first command message in the bridge, transmitting the first command message to the second device, commanding the first device to re-transmit the command message and receiving the re-transmitted command message from the first device in the bridge until the stored first command message matches the re-transmitted message, and transmitting the reply message to the first device. In another embodiment, the method also comprises the steps of receiving a first command message from the second device in a bridge coupled between the first device and the second device, the message comprising a device command, storing the first command message in the bridge, requesting access to the first device, transmitting the first command message from the bridge to the first device when access to the first device is granted and the first device is idle, receiving a reply message responsive to the first command message from the first device in the bridge, and transmitting the reply message to the second device.

BRIEF DESCRIPTION OF THE DRAWINGS

Referring now to the drawings in which like reference numbers represent corresponding parts throughout:

FIGS. 2A and 2B present a flow chart of the operations performed by the host bus slave interface of the present invention;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is understood that other embodiments may be utilized and structural changes may be made without departing from the scope of the present invention.

Figure 1A:
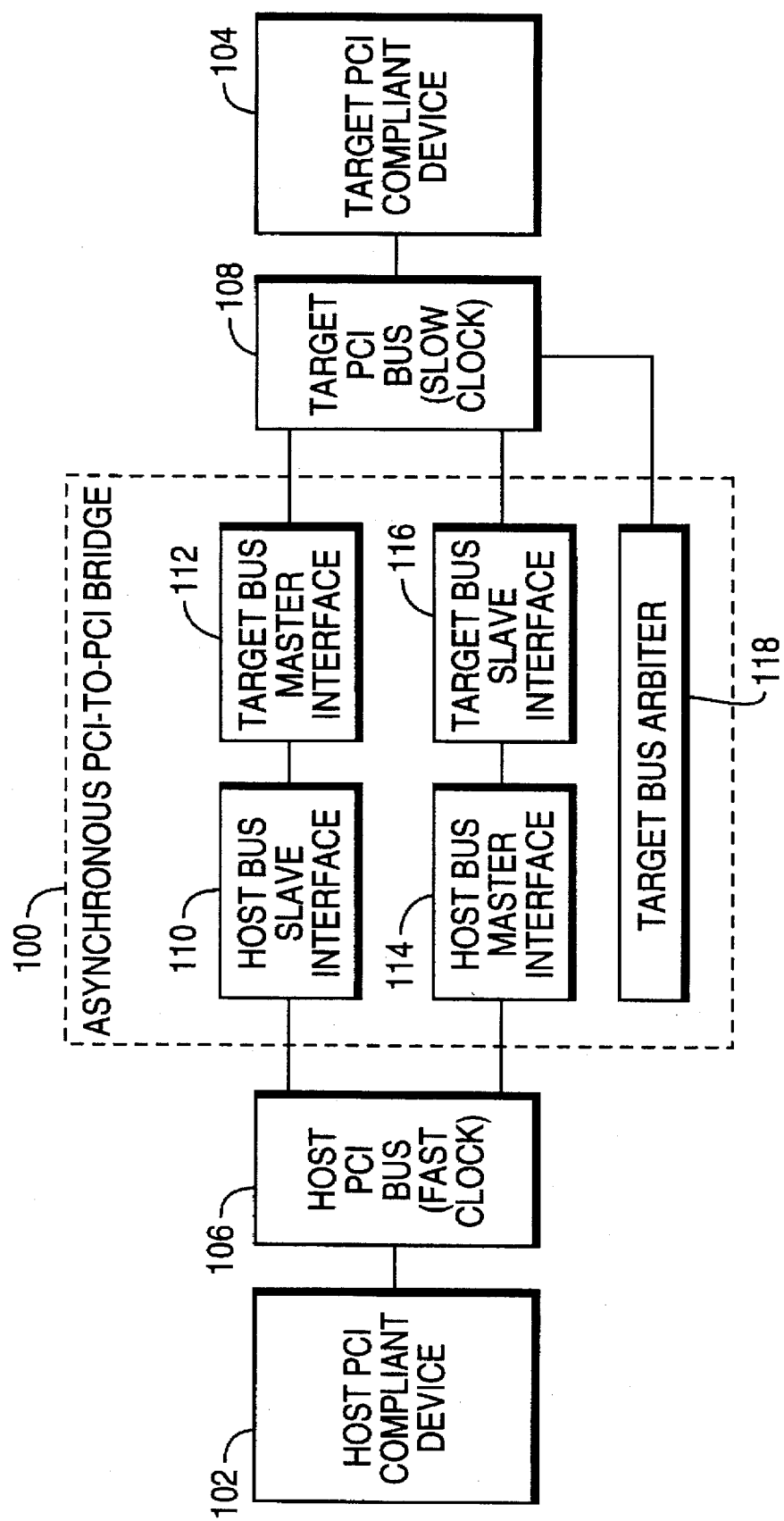
FIG. 1a presents a top-level block diagram of the present invention.

FIG. 1a presents a top-level block diagram of the asynchronous PCI-to-PCI bridge (APB) (100). The bridge is coupled between a host PCI-compliant device (102) and a target PCI-compliant device (104) by a host PCI bus (106) and a target PCI bus (108) respectively. The APB (100) comprises a host bus slave interface (110) coupled to a target master bus interface (112), and a host bus master interface (114) coupled to a target bus slave interface (116). A target bus arbiter (118) is coupled to the target bus. The function and operation of each of these components is further discussed below.

Figure 1B:
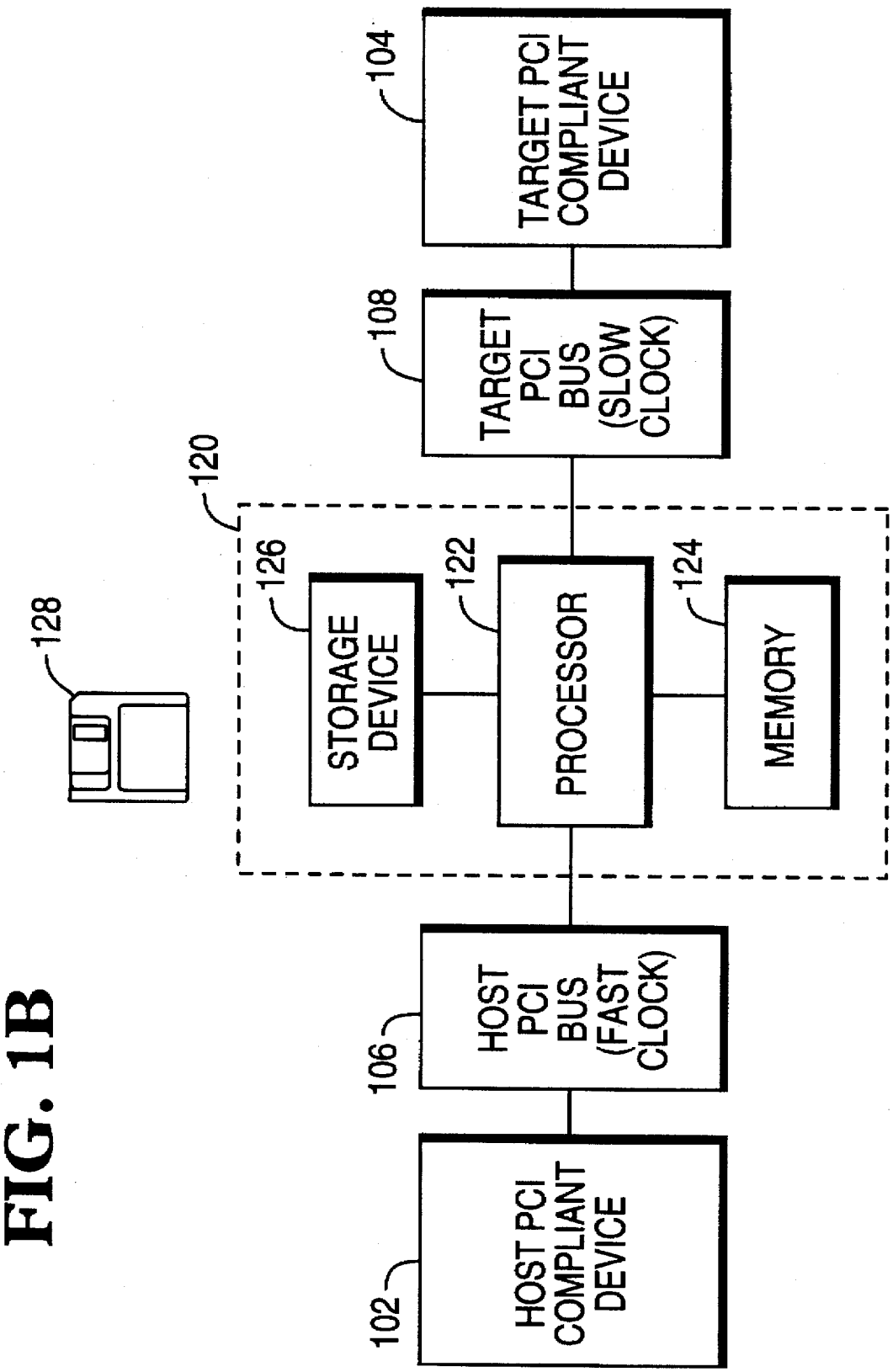
FIG. 1b presents a top-level block diagram of the present invention implemented on a computer.

It is noted that the present invention need not be limited in application or scope to PCI-compliant devices. Instead, the method and apparatus described herein can serve as an asynchronous bridge between any devices complying with a predefined interface protocol. Further, many possible implementations of bridge illustrated in FIG. 1a are possible. One possible implementation would utilize commonly available flip flops and other logical memory devices to create a special purpose APB (10). Similarly, the functions described herein performed by the APB (100) could be performed by a microprocessor coupled to a memory device. Finally, the elements shown in FIG. 1a could be implemented by a computer (120) coupled between the host PCI bus (106) and the target PCI bus (108), as shown in FIG. 1b. The computer may include, inter alia, a processor (122), a memory (124), as well as a fixed and/or removable storage device (126) and associated media (128). Those skilled in the art will recognize that any combination of the above components, or any number of different components, peripherals, and other devices may be used to implement the processes and structures defined herein.

Figure 2B:
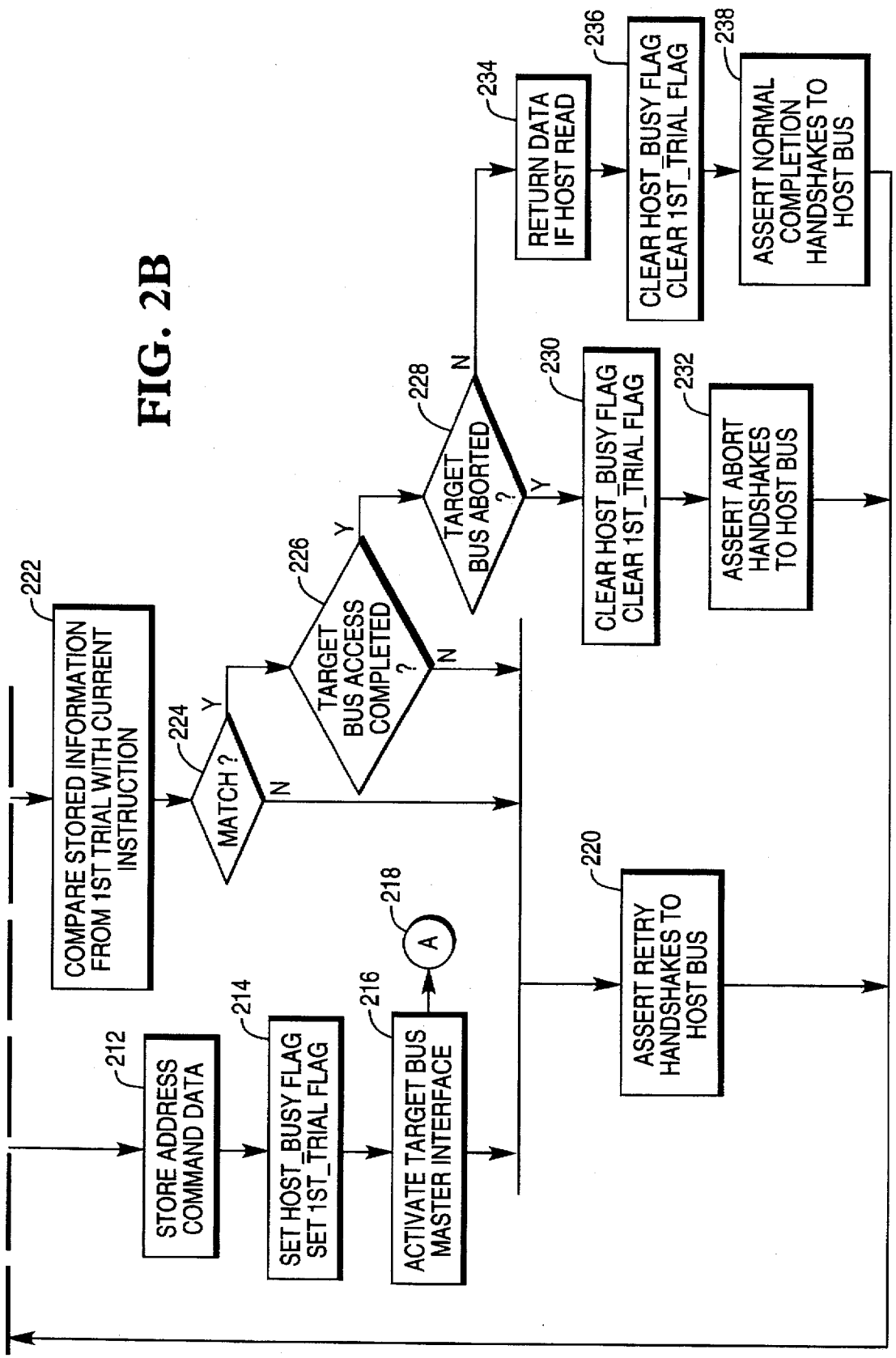

FIG. 2 presents a flow chart of the operations performed by the host bus slave interface (110). The process begins and ultimately ends with the host PCI bus (106) in an idle state (200). From the idle state (200), the host bus slave interface (110) determines whether the host bus has requested access (202) to the bridge. This is indicated when the FRAME signal pin on the host PCI bus (106) is asserted active. This is indicated when the FRAME pin is logically low. Next, the instruction from the host PCI bus (106) is examined to determine if the instruction is an instruction supported (204) by the target PCI device (104) and the APB (100). For example, invalidate instructions only apply to the system memory of the host motherboard, and are not supported by the APB or the target PCI device. If this instruction was indicated, the APB returns to the idle state (200). Thereafter, the host slave bus interface (110) determines (206) if the APB was selected, using the message from the host PCI-compliant device (102). Ordinarily, this is determined from the address or address range or window as specified by the message. If the address is within the APB (100) address window, the address, data, and command are captured (208). This involves storing these values to save them for later use. This data will later be overwritten in subsequent trials, as described below.

Next, the host slave bus interface (110) determines whether this was the first trial for the captured command (208). If this is not the first trial for this command or instruction, the instruction address, command, and data is stored for later use. This stored data is later used to implement a delayed action interface between the two PCI devices. After storing (212) the instruction, the host slave bus interface (110) sets (214) a HOST_BUSY flag and a 1ST_TRIAL flag. The HOST_BUSY flag indicates that the host PCI-compliant device (102) is accessing the APB (100). This flag is later used to notify other elements of the APB that the host is busy. The 1ST_TRIAL flag is used to implement the function indicated in block (210).

Next, after receiving the command instruction from the host PCI bus (106), the target bus master interface (112) is accessed (216), and further processing (218) is performed. Since clock frequency and hence the speed of the target PCI bus (108) may be lower than the host PCI bus (106), it is undesirable to hold the host PCI bus (106). To avoid holding the host PCI bus (106), retry handshakes are asserted (220) to the host PCI bus (106). This frees the host PCI bus (106) for other operations while data is retrieved from or written to the target PCI bus (108). Retry handshake assertion (220) is performed in compliance with PCI interface protocols which are well known in the art, and described in the PCI Local Bus Specification, Rev. 2.0, incorporated by reference herein. In one embodiment of the present invention, a delay is inserted before retry handshakes are asserted (220) to the host PCI Bus (106). This delay allows other components to access the PCI Bus (106). This time delay can be set to any desired value, but should be at least two clock periods.

While the retry handshakes are being asserted (220) to the host PCI (106), the target bus master interface (112) is activated (216) by generating a HOSTREQ signal, and passing that signal to the target bus master interface (112).

Figure 3:
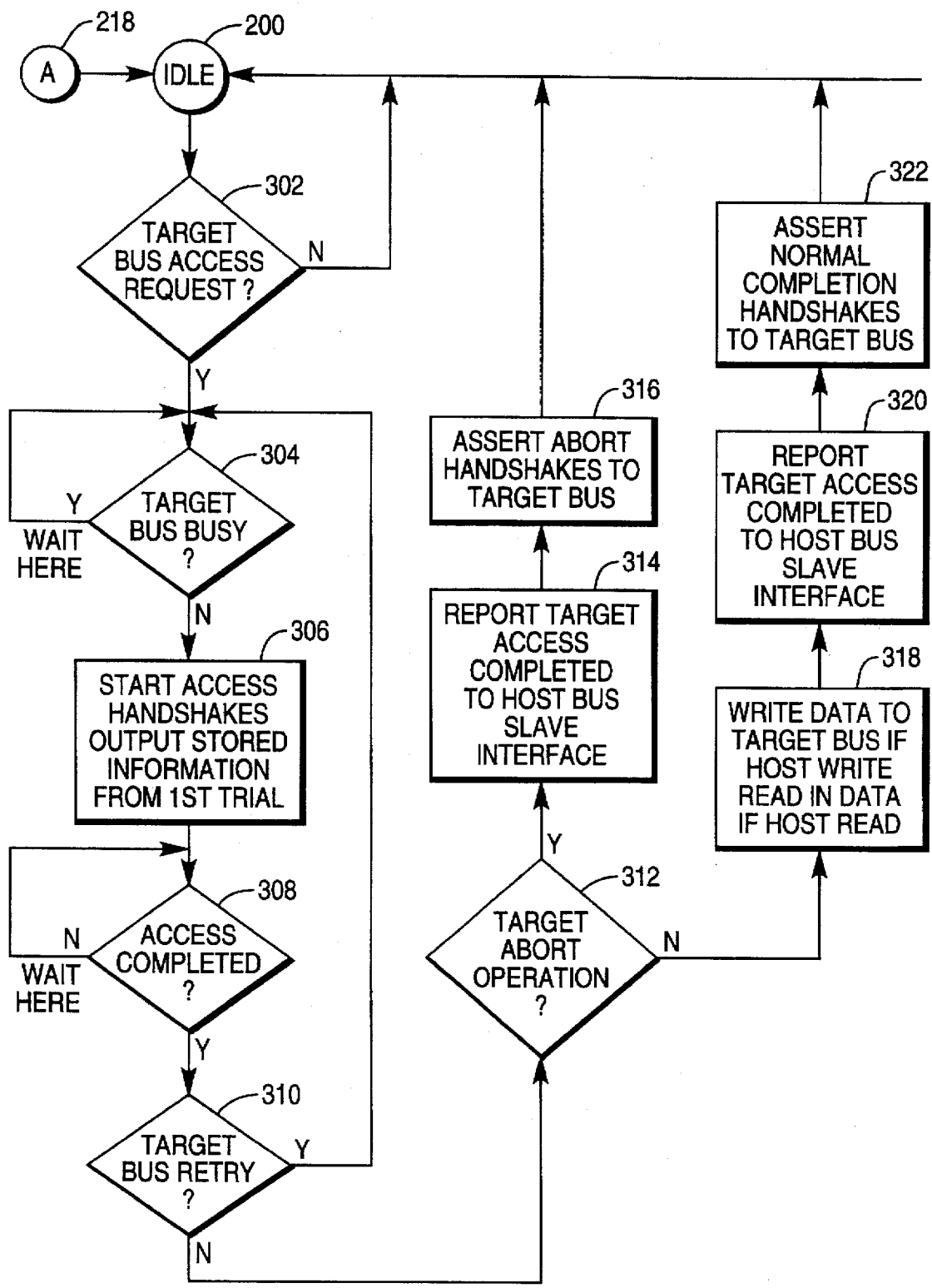
FIG. 3 presents a flow chart of the operations performed by the target bus master interface of the present invention.

FIG. 3 is a flow chart that describes the functions performed by the bus master interface (112). From the idle state (200), the target bus master interface (112) checks to see if access to the target bus has been requested (302), by examining the HOSTREQ signal. If target bus access has not been requested, the target bus master interface (112) returns to the idle state (200). If target bus access has been requested, the target bus is queried to determine if it is busy (304). This is accomplished by examining a QBUSY signal generated by the target bus arbiter (118), as described in detail later in this specification. If the target bus is busy, it is retried until the bus is no longer busy. When the target bus is not busy, access handshakes are asserted (306) to the target bus. This procedure is well known in the art, and described in detail in the PCI Local Bus Specification, Rev. 2.0, incorporated by reference herein.

Thereafter, the instruction or command information that was stored (212) in the APB (100) is outputted to the target bus master interface (112). This data is later asserted to the target PCI bus (108). Next, the target bus master interface (112) checks to determine if the access process is completed (308) indicating that the target PCI device (104) is ready to accept the instruction or command. If the target PCI device (104) is not prepared to accept the instruction or command (310), the access process begins anew. If the target PCI device (104) and the target PCI bus (108) is prepared to accept the command, processing continues. If an abort command was received (312) from the target PCI-compliant device (104), that target access was completed is reported (314) to the host slave bus interface (110), and abort handshakes are asserted to the target bus. This process is well known in the art, and described in detail in the PCI Local Bus Specification, Rev. 2.0, incorporated by reference herein.

If no abort command was received from the target PCI-compliant device (104), the stored instruction or command is asserted to the target PCI bus (108). If the instruction was a write command, the data is written (318) to the target PCI bus (108), and if the instruction was a read command, the data is read (318) from the target PCI bus (108). Thereafter, that target access was completed is reported (320) to the host slave bus interface (110), and normal completion handshakes are asserted (322) to the target bus.

Referring back to FIG. 2, the reader will recall that while the target bus master interface (112) was activated (216), retry handshakes were asserted (220) to the host PCI bus (106) to command the host bus to re-transmit the given instruction. Since the host PCI bus (106) is faster than the target PCI bus, this prevents the host PCI bus from being hung-up waiting for the target PCI bus to respond. In one embodiment, a time delay may be implemented before the retry handshakes are asserted to allow other devices to access the host PCI bus (106). After the host PCI bus (106) responds to the retry command with a re-transmitted command, the host slave bus interface (110) responds as described earlier by capturing (208) the re-transmitted command if the instruction is supported (204), and the APB is selected (206). Next, the HOST_BUSY flag is examined (210) to determine if this is the first pass through the APB (100) for this instruction. Assuming the process previously described have taken place, the HOST_BUSY flag will be set, and the host slave bus interface (110) will then compare (222) the stored information from the first pass with the captured current instruction. If the stored information from the first pass and the captured current instruction do not match (224), retry handshakes are again asserted (220) to the host PCI bus (106), as described earlier. If the stored information and the captured current instructions match (224) and target bus access is completed (226), the host slave bus interface checks to see if an abort command was received (228) from the target PCI-compliant device (104). If so, the HOST_BUSY and 1ST_TRIAL flags are cleared (230), and abort handshakes are asserted (232) to the host PCI bus (106). If no abort command was received from the target PCI-compliant device (104), processing continues as shown in blocks (234–236). If the command instruction was to read data from the target PCI-compliant device (104), this data is returned (234) from the target bus master interface (112) to the host PCI bus (106). Finally, processing is completed by clearing (236) the HOST_BUSY flag and the 1st_TRIAL flag and asserting normal completion handshakes (238) to the host PCI bus (106). This completes the process wherein the host PCI-compliant device (102) performs as the master, and the target PCI-compliant device (104) performs as the slave.

Figure 4:
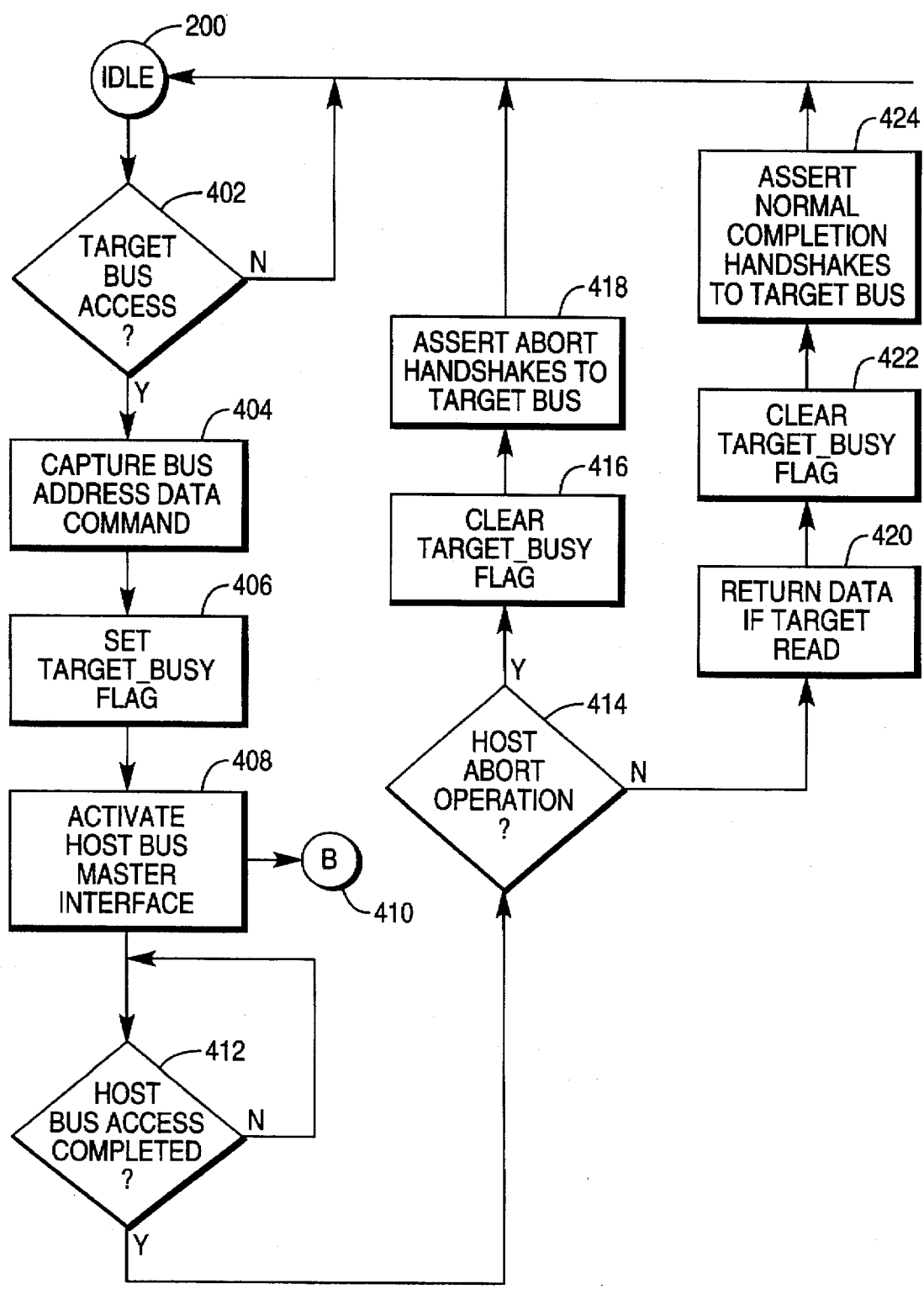
FIG. 4 presents a flow chart of the operations performed by the target bus slave interface.
Figure 5A:
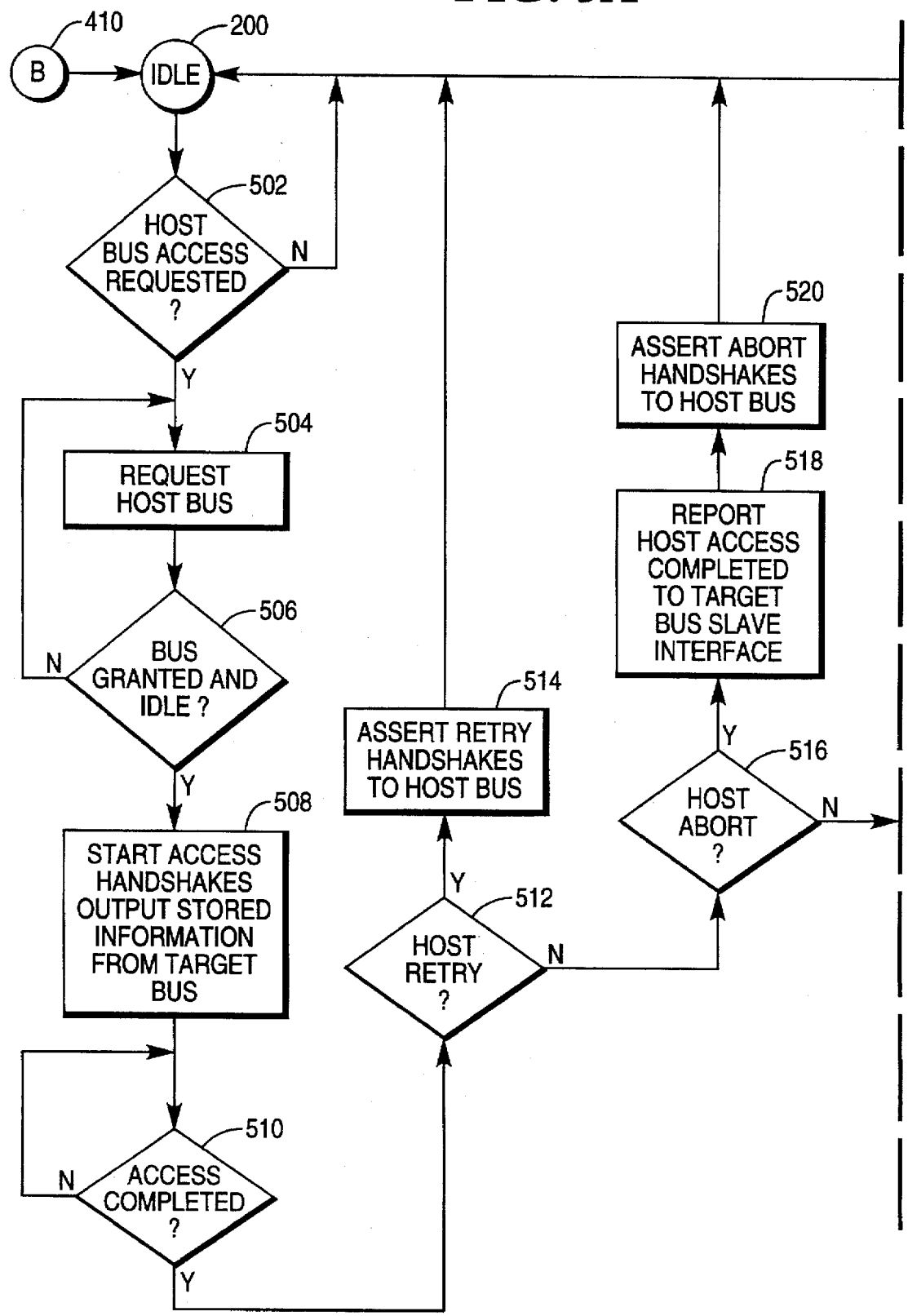
FIGS. 5A and 5B present a flow chart of the operations performed by the host bus master interface.
Figure 5B:
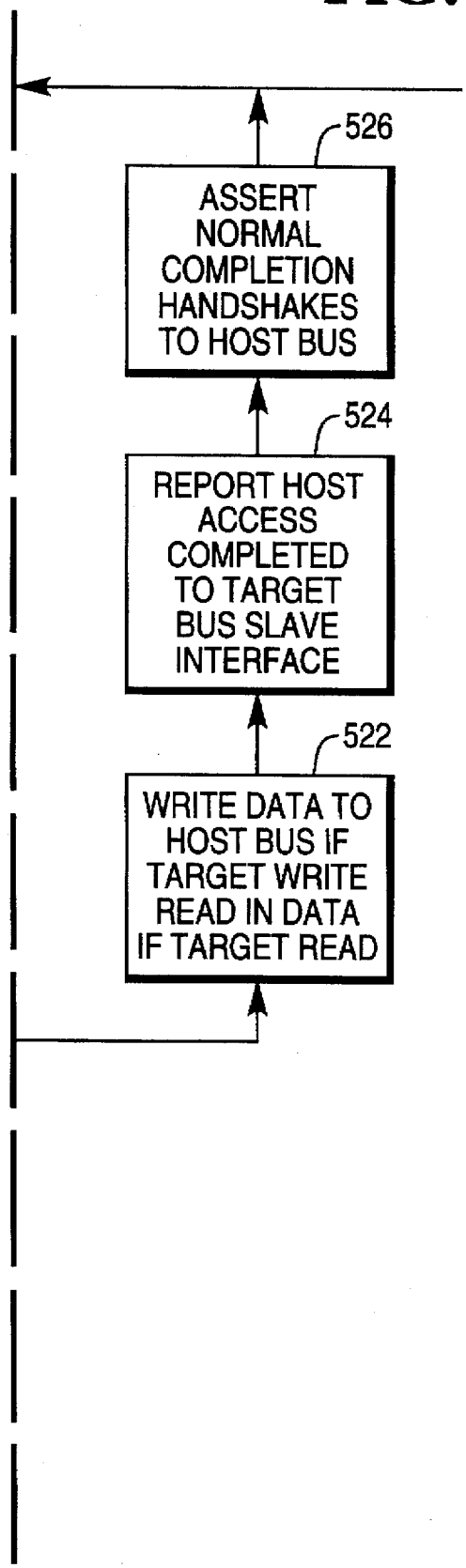

FIGS. 4 and 5 are flow charts illustrating the operation of one embodiment of the present invention whereby the slower clocked PCI-compliant device operates as the master and the faster clocked PCI-compliant device operates as the slave.

FIG. 4 illustrates the operations performed by the target bus slave interface (116). As before, the process begins from the idle state (200). First, the target bus slave interface (116) determines (402) if the target bus requests access to the host PCI bus (106) by examining the QREQ flag. Next, the address, data, and command of the instruction from the target PCI bus are captured (404). This involves storing these values for later use. Next, the Q_BUSY flag is set, and the host bus master interface is activated. The processes associated with the host bus master interface (114) are described below.

FIG. 5 is a flow chart describing the operations performed by the host bus master interface (114). From the idle state (200), the host bus master interface (114) determines if access to the host bus was requested (502) by examining the QREQ flag. If access was not requested, the host bus master interface (114) returns to the idle state (200). If access was requested, the host bus master interface (114) requests access to the host bus by activating a H_REQ signal. While the host PCI bus may grant the bus (as indicated by the GNT signal), the host PCI bus may not be idle. Instead, the GNT signal merely indicates that the requestor will be the next owner of the bus. By assuring that the host PCI bus (106) is granted and idle before continuing, the host PCI bus is not unduly slowed down waiting for a target PCI bus (108) response. Further, by obtaining the bus grant, the host bus master interface (114) reserves the bus for use as soon as it becomes idle.

The host bus master interface (114) waits until the host PCI bus is both granted an idle. When this occurs, access handshakes with the host bus are begun and the information captured from the target bus (404) is output to the host bus master interface (114.) In one embodiment of the invention, to further assure proper communications, access handshakes are delayed until another GNT signal is received from the host PCI bus (106). These access handshake protocol are well known in the art and are described in the PCI Local Bus Specification, Rev. 2.0, incorporated by reference herein. Next, the host bus master interface (114) determines if access to the host PCI bus (106) is completed (510). After access is completed, the host master bus interface (114) determines if a retry command was received from the host PCI bus (106). If a retry command was received (512), retry handshakes are asserted to the host bus (514), using the protocol defined in the PCI Local Bus Specification referenced herein. If a retry command was not received, the host bus master interface checks to determine if a host abort command was received (516). If a host abort command was received, a H_DONE flag is set to report (518) a message to the target bus slave interface (116) that host PCI bus access was successfully completed. Thereafter, abort handshakes are asserted (520) to the host PCI bus (106). If an abort command was not received, the host bus master interface (114) performs the command or instruction supplied from the target bus slave interface (116). If the command was a read command, the data from the host PCI bus (106) is read (522). If the command was a write command, the indicated data is written (522) to the host PCI bus (106). Thereafter, a H_DONE flag is set to report (518) a message to the target bus slave interface 116 that host PCI bus access was successfully completed, and normal completion handshakes are asserted to the host PCI bus (106). Of course, if an illegal or unsupported instruction was provided, the command will not be supplied to the host PCI bus (106). This error may be reported to the target PCI bus (108), or may simply cause the APB to hang up. Further, illegal instructions may be detected and reported in the target bus slave interface (116).

Returning to FIG. 4, while host bus master interface (114) processes are being performed, the target bus slave interface (116) checks to see if the host PCI bus access is completed (412), by examining an H_DONE signal. If so, the target bus slave interface (116) checks (414) to see if the host PCI bus has aborted. If so, the Q_BUSY flag is cleared (416), and abort handshakes are asserted (418) to the target PCI bus (108). If no abort message was received, any data read from the host PCI bus (106) is returned to the target PCI bus (108). Thereafter, the Q_BUSY flag is cleared (422), and normal completion handshakes are asserted (424) to the target PCI bus (108).

Figure 6:
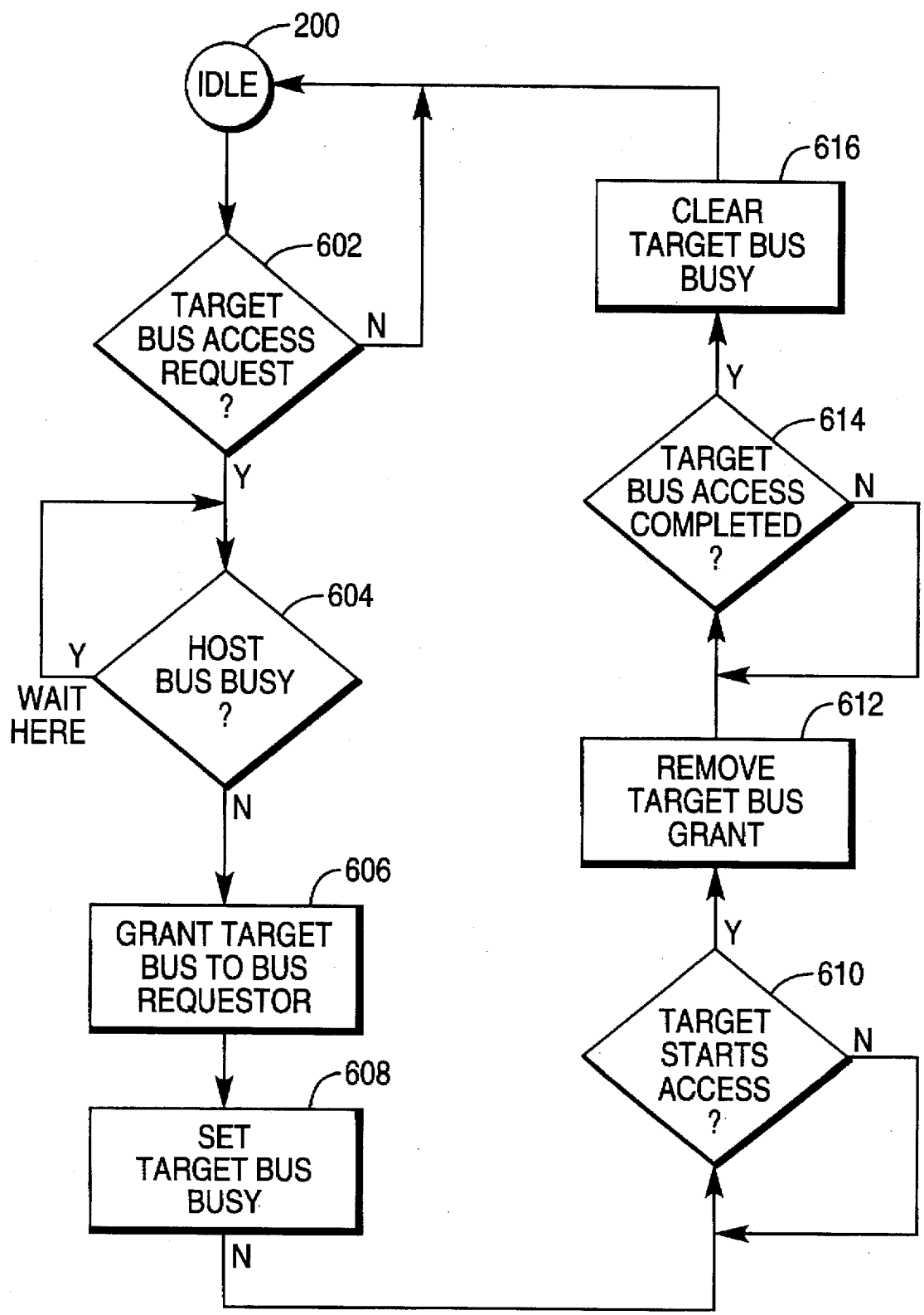
FIG. 6 presents a flow chart of the operations performed by the target bus arbiter.

FIG. 6 presents a flow chart describing the functions performed by the target bus arbiter (118). From the idle state (200), the target bus arbiter (118) determines if access to the target bus has been requested. This is indicated by a QREQ signal. When the host PCI bus (106) is not busy (604) as indicated by the HBUSY signal, the target PCI bus (108) is granted (606) to the bus requestor by setting the QGRANT signal. Thereafter, the QBUSY signal is set, indicating that the target PCI bus (108) is busy. The target bus arbiter (118) then waits until the target PCI bus (108) begins access as indicated by the QFRAME signal, and then removes the QGRANT signal, indicating that the target bus is no longer granted to the requestor. Finally, after the target PCI bus access is completed (614), the QBUSY flag is cleared (616), indicating that the target PCI bus is no longer busy, and the target bus arbiter returns to the idle state (200), and waits for the next request.

It is noted that while the target PCI-compliant device (104) is described above as operating at a clock frequency lower than that of the host PCI-compliant device (102), the device clock frequencies need not be so related. The present invention provides a bridge between any devices with independent or independently controllable clocks. Hence, the present invention may be practiced with a target PCI compliant device (104) with a faster clock frequency than that of the host PCI-compliant device (102), or with a PCI compliant device (104) with a variable or controllable clock frequency.

CONCLUSION

This concludes the description of the preferred embodiment of the invention. In summary, the present invention discloses a method and apparatus for bridging a first device operating at a first clock frequency with a second device operating at a second clock frequency.

The method comprises the steps of receiving a first command message from the first device in a bridge coupled between the first and the second device, storing the first command message in the bridge, transmitting the first command message to the second device, commanding the first device to re-transmit the command message and receiving the re-transmitted command message from the first device in the bridge until the stored first command message matches the re-transmitted message, and transmitting the reply message to the first device. In another embodiment, the method also comprises the steps of receiving a first command message from the second device in a bridge coupled between the first device and the second device, the message comprising a device command, storing the first command message in the bridge, requesting access to the first device, transmitting the first command message from the bridge to the first device when access to the first device is granted and the first device is idle, receiving a reply message responsive to the first command message from the first device in the bridge, and transmitting the reply message to the second device.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of bridging a first device operating at a first clock frequency with a second device operating at a second clock frequency, comprising the steps of:
   (a) receiving a first command message from the first device in a bridge coupled between the first device and the second device, the message comprising a device command;
   (b) storing the first command message in the bridge;
   (c) transmitting the first command message to the second device;
   commanding the first device to re-transmit the first command message;
   (e) receiving the re-transmitted command message from the first device in the bridge;
   (f) repeating steps (d)–(e) until the stored first command message matches the re-transmitted message; and
   (g) repeating steps (d)–(f) until a reply message is received from the second device, the reply message responsive to the first command message; and
   (h) transmitting the reply message to the first device.

2. The method of claim 1 wherein the first device is a PCI-compliant device, the second device is a PCI-compliant device, and the device command is a PCI-compliant device command.

3. The method of claim 2 wherein:
   the command message comprises a write command and data; and
   the reply message comprises a message indicating that the data was written to the second PCI-compliant device.

4. The method of claim 2 wherein:
   the command message comprises a read command; and
   the reply message comprises data from the second PCI-compliant device responsive to the read command.

5. The method of claim 2 wherein the method further comprises the step of delaying for a time period of at least two first clock periods before commanding the first PCI-compliant device to re-transmit the command message.

6. The method of claim 2 wherein the step of receiving the first command message further comprises the steps of:
   determining if the PCI-compliant device command is supported by the second PCI-compliant device; and
   returning the bridge to an idle state when the PCI-compliant device command is not supported by the second PCI-compliant device.

7. A method of bridging a first device operating at a first clock frequency with a second device operating at a second clock frequency, comprising the steps of:
   receiving a first command message from the second device in a bridge coupled between the first device and the second device, the message comprising a device command;
   storing the first command message in the bridge;
   accessing the first device;
   transmitting the first command message from the bridge to the first device when access to the first device is granted and the first device is idle;
   receiving a reply message responsive to the first command message from the first device in the bridge; and
   transmitting the reply message to the second device.

8. The method of claim 7 wherein the first device is a PCI-compliant device, the second device is a PCI-compliant device, and the device command is a PCI-compliant device command.

9. The method of claim 8 wherein:
   the command message comprises a write command and data; and
   the reply message comprises a message indicating that the data was written to the first PCI-compliant device.

10. The method of claim 8 wherein:
    the command message comprises a read command; and
    the reply message comprises data from the second PCI-compliant device responsive to the read command.

11. The method of claim 8 wherein the step of accessing the first PCI-compliant device comprises the steps of:
    (a) requesting access to the first PCI-compliant device by transmitting a request signal from the bridge to the first PCI-compliant device;
    (b) receiving a signal from the first PCI-compliant device in the bridge indicating that the first PCI-compliant device has been granted to the bridge;

(c) receiving a signal indicating that the first PCI-compliant device is idle;

(d) releasing the first PCI-compliant device if the first PCI-compliant device is not idle;

(e) repeating steps (a)–(d) until the PCI-compliant device is both granted and idle; and (f) performing PCI access handshaking when the PCI-compliant device is both granted and idle.

12. The method of claim 11 further comprising the step of repeating the step of receiving a signal from the first PCI-compliant device in the bridge indicating that the first PCI-compliant device has been granted to the bridge before performing the step of performing PCI access handshaking.

13. An apparatus for bridging a device operating at a first clock frequency with a second device operating at a second clock frequency, comprising a bridge coupled between the first device and the second device, the bridge further comprising:

a first bus slave interface coupled to the first device, the first bus slave interface comprising means for receiving a first command message, for storing the first command message, for commanding the first device to re-transmit the command message, for receiving the re-transmitted command message from the first device, for determining if the stored first command message matches the re-transmitted command message, for determining if a reply message responsive to the first command message is received, for transmitting the reply message to the first device; and a second bus master interface coupled to the first bus slave interface and the second device, the second bus master interface further comprising means for transmitting the first command message to the second device, and means for receiving the reply message from the second device and forwarding the reply message to the first bus slave interface.

14. The apparatus of claim 13 wherein the first device is a PCI-compliant device, the second device is a PCI-compliant device, and the device command is a PCI-compliant device command.

15. The apparatus of claim 14 wherein the bridge further comprises a target bus arbiter for arbitrating access to the second PCI-compliant device.

16. The apparatus of claim 14 wherein the means for receiving the first command message further comprises means for determining if the PCI-compliant device command is supported by the second PCI-compliant device; and means for returning the bridge to an idle state when the PCI-compliant device command is not supported by the second PCI-compliant device.

17. The apparatus of claim 14 wherein the first bus slave interface further comprises a delaying means for postponing commands to the first PCI-compliant device to re-transmit the command message for at least two clock periods.

18. The apparatus of claim 14 wherein the bridge further comprises:

a second bus slave interface coupled to the second PCI-compliant device, the second bus slave interface comprising means for receiving a first command message from the second PCI-compliant device, the message comprising a PCI-compliant device command, means for storing the first command message, means for transmitting a reply message responsive to the first command message to the second PCI-compliant device; and a first bus master interface coupled to the second bus slave interface and the first PCI-compliant device, comprising means for accessing to the first PCI-compliant device, means for transmitting the first command message to the first PCI-compliant device when the PCI-compliant device is available means for receiving the reply message from the first PCI-compliant device.

19. The apparatus of claim 14 wherein the means for accessing the first PCI-compliant device comprises:

means for transmitting a request signal to the first PCI-compliant device;

means for receiving a signal from the first PCI-compliant device indicating that the first PCI-compliant device has been granted;

means for receiving a signal indicating that the first PCI-compliant device is idle;

means for releasing the first PCI-compliant device if the first PCI-compliant device is not idle; and means for performing PCI access handshaking when the PCI-compliant device is both granted and idle.

20. A program storage device, readable by a computer having a processor and a memory, tangibly embodying one or more programs of instructions executable by the computer to perform method steps of bridging a first device operating at a first clock frequency with a second device operating at a second clock frequency, the method comprising the steps of:

(a) receiving a first command message from the first device in a bridge coupled between the first device and the second device, the message comprising a device command;

(b) storing the first command message in the bridge;

(c) transmitting the first command message to the second device;

(d) commanding the first device to re-transmit the first command message;

(e) receiving the re-transmitted command message from the first device in the bridge;

(f) repeating steps (d)–(e) until the stored first command message matches the re-transmitted message; and (g) repeating steps (d)–(f) until a reply message is received from the second device, the reply message responsive to the first command message; and (h) transmitting the reply message to the first device.

21. The program storage device of claim 20 wherein the first device is a PCI-compliant device, the second device is a PCI-compliant device, and the device command is a PCI-compliant device command.

22. The program storage device of claim 21 wherein the method further comprises the step of delaying for a time period of at least two first clock periods before commanding the first PCI-compliant device to re-transmit the command message.

23. A program storage device, readable by a computer having a processor and a memory, tangibly embodying one or more programs of instructions executable by the computer to perform method steps of bridging a first device operating at a first clock frequency with a second device operating at a second clock frequency, the method comprising the steps of:

receiving a first command message from the second device in a bridge coupled between the first device and the second device, the message comprising a device command;

storing the first command message in the bridge;

accessing the first device;

transmitting the first command message from the bridge to the first device when access to the first device is granted and the first device is idle;

receiving a reply message responsive to the first command message from the first device in the bridge; and transmitting the reply message to the second device.

24. The program storage device of claim 23 wherein the first device is a PCI-compliant device, the second device is a PCI compliant device, and the device command is a PCI-compliant device command.

25. The program storage device of claim 24 wherein the step of accessing the first PCI-compliant device comprises the steps of:

(a) requesting access to the first PCI-compliant device by transmitting a request signal from the bridge to the first PCI-compliant device;

(b) receiving a signal from the first PCI-compliant device in the bridge indicating that the first PCI-compliant device has been granted to the bridge;

(c) receiving a signal indicating that the first PCI-compliant device is idle;

(d) releasing the first PCI-compliant device if the first PCI-compliant device is not idle;

(e) repeating steps (a)–(d) until the PCI-compliant device is both granted and idle; and (f) performing PCI access handshaking when the PCI-compliant device is both granted and idle.

* * * * *

UNITED STATES PATENT AND TRADEMARK OFFICE
CERTIFICATE OF CORRECTION

PATENT NO.     : 5,712,986                                        Page 1 of 1
DATED          : January 27, 1998
INVENTOR(S)    : Vo It is certified that error appears in the above-identified patent and that said Letters Patent is hereby corrected as shown below:

Column 6,
Line 5, replace "an" with -- and --

Column 7,
Line 64, replace "commanding" with -- (d) commanding --

Signed and Sealed this

Fifteenth Day of October, 2002

Attest:

Attesting Officer

JAMES E. ROGAN
Director of the United States Patent and Trademark Office